Figure 1:
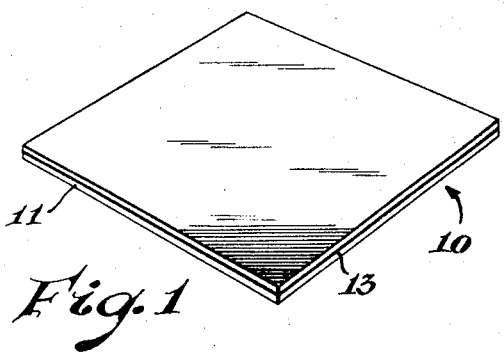

May 8, 1962 G. H. LACY ET AL 3,033,707
LAMINATE FILM AND METHOD FOR PRODUCING SAME USING
POLYALKYLENE IMINE AS A BONDING AGENT
Filed April 27, 1959

INVENTORS.
George H. Lacy
Raymond R. Chervenak
BY Jerome Rudy
ATTORNEY

United States Patent Office 3,033,707
Patented May 8, 1962

3,033,707
LAMINATE FILM AND METHOD FOR PRODUCING SAME USING POLYALKYLENE IMINE AS A BONDING AGENT
George H. Lacy, Rocky River, and Raymond R. Chervenak, Cleveland, Ohio, assignors to The Dow Chemical Company, Midland, Mich., a corporation of Delaware
Filed Apr. 27, 1959, Ser. No. 809,161
20 Claims. (Cl. 117—76)

The present invention contributes to the art of providing film or foil and analogous sheet-like structures for wrapping, packaging, decorative and related purposes. More particularly, this invention pertains to new and useful film or foil structures comprised of a layer of polyethylene or the like non-aromatic hydrocarbon (i.e., aliphatic) olefin polymer that is effectively and efficiently laminated or bonded to and, as it were, supported upon and by a pre-formed substrate layer or sheet of saran coated regenerated cellulose (i.e., cellophane).

Films and other shaped articles of polyethylene, polypropylene and the like non-aromatic hydrocarbon olefin polymers have many attractive characteristics including, in general: pronounced chemical inertness; good physical properties (especially significant strength, toughness and resistance to tearing); excellent behavior, without marked tendency to embrittlement, at low temperatures; satisfactory moisture vapor barrier properties; and, in particular, unusual capability for and easy susceptibility of being heat sealed in order to form and provide strong, permanent joints upon being thermally welded or fused together when in contact under the influence of heat at elevated temperatures and, if desired, pressure along the seam or other welded area being joined.

The latter feature, as is well known and widely appreciated by those skilled in the art, is of great desirability and decided advantage for fabrication of film and analogous sheet-like structures into many useful articles and products (such as bags, pouches, etc.) and in the general utilization thereof for many wrapping and packaging applications. Incidentally, such feature and characteristic is not readily obtainable in film and analogous sheet-like articles of saran coated regenerated cellulose. Such materials are relatively thermally insensitive materials that do not generate any seal strength upon being attempted to be heat sealed or thermally welded together.

On the other hand, film structures and the like shaped articles of saran coated regenerated cellulose, besides having generally satisfactory properties and characteristics as film materials, have (due to their integral saran coating) an unusual ability to provide particularly effective barriers against the transmission or permeation of gases and vapors in addition to water vapor. Furthermore, such saran coated films of regenerated cellulose are usually not as prone to becoming surface scuffed or marred in use as are the typical polymers or ethylene, propylene and the like.

Despite the obvious beneficial utility as a flexible, vapor-proof film or foil article or analogous sheet-like structure which would be easily susceptible to being heat sealable that could be provided by composite laminate structures comprised of polyethylene and the like non-aromatic hydrocarbon film bonded or laminated to a sheet or the like of saran coated regenerated cellulose film much difficulty has been experienced in their derivation. This is because of the inefficient bonding and poor adherence that is experienced when laminating sheets or films of saran coated regenerated cellulose are attempted to be formed into composite structures with polyethylene and the like film and other articles.

Polyethylene and the like film and other articles, as is well known, commonly have a smooth and sleek, relatively slippery and wax-like surface which is poorly adapted to provide for suitable adhesion or anchorage of applied materials by mere physical attachment. In addition, the relatively inert chemical nature of polyethylene and the like non-aromatic hydrocarbon polyolefins resist the efficient attachment of most materials by chemical inter-linkage or bonding.

It is among the principal objects of the present invention to provide an efficient and effective method for coating or laminating films, foils or analogous sheet-like substrates of saran coated regenerated cellulose with tightly adhering, integral layers of non-aromatic hydrocarbon olefin polymers including, in particular, polyethylene, polypropylene and the like compositions. It is also an object of the invention to provide utile laminate or composite structures of saran coated regenerated cellulose sheets or films efficaciously laminated to and bonded with coated layers of polyolefins, such as polyethylene, which composite structures or articles are particularly adapted for employment as flexible, vapor-proof materials, particularly capable of being joined or thermally welded by conventional heat sealing techniques, for packaging and the like protective and decorative uses.

All of the foregoing and still further objects and advantages are readily achieved by practice of and in accordance with the present invention wherein film, foil and analogous sheet-like substrates of saran coated regenerated cellulose are effectively provided with a tightly adhered and firmly anchored coating or sheet-like layer of laminated polyethylene or the like non-aromatic hydrocarbon olefin polymer (including, as has been indicated, polypropylene, polybutylene, copolymers of ethylene and propylene, etc.) by a method which comprises initially applying to a saran coated surface of the coated regenerated cellulose substrate (or treating such surfaces with) a small quantity of a polyalkylene imine compound as an intermediate adhesion-promoting coat or layer; and subsequently applying over the polyalkylene imine treated surface of the saran coated regenerated cellulose substrate a fused or molten sheet-like coating layer of the desired polyolefin polymer; then cooling and solidifying the deposited polyolefin layer on the polyalkylene imine treated surface of the saran coated regenerated cellulose substrate.

The resulting composite or laminated film or foil structures or articles which may advantageously be obtained by practice of the present invention possess, to an unusual degree, practically all of the desirable and beneficial attributes and properties of both the saran coated regenerated cellulose substrate layer and the applied polyolefin layer that are laminated therein. In addition, as indicated, the resulting composite structures are heat sealable in the conventional manner when joined under thermal welding conditions by means of the applied and laminated polyolefin layer.

Figure 2:
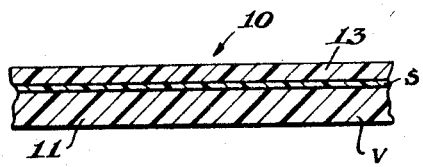
Figure 3:
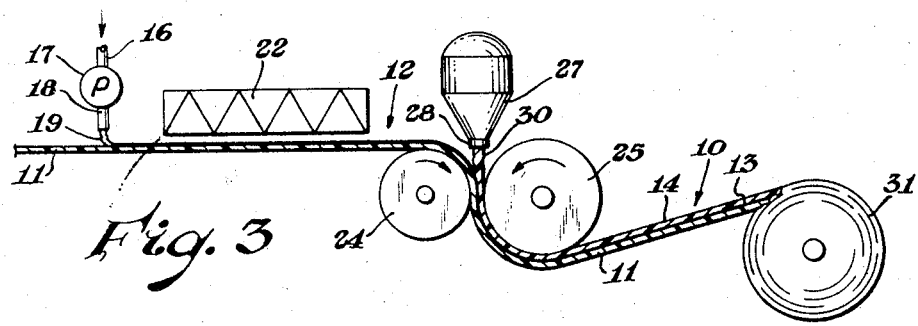
Figure 4:
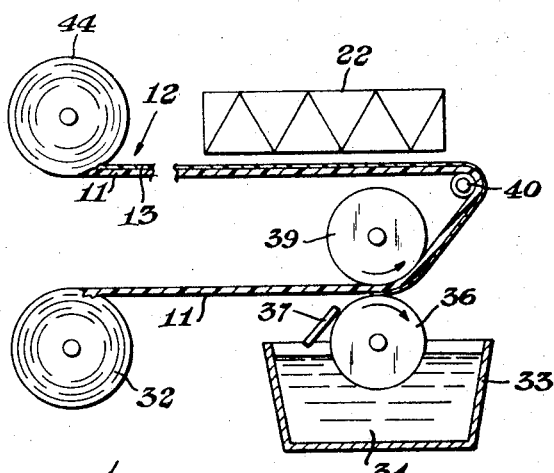
Figure 5:
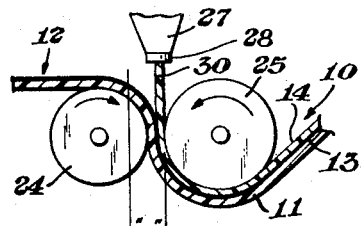

Yet additional objects and advantages of the invention, and its numerous cognate benefits and features, are even more apparent and readily manifest in and by the ensuing description and specification, taken in conjunction with the accompanying drawing in which, wheresoever possible, like characters of reference designate corresponding materials and parts throughout the several views thereof, and wherein:

FIGURE 1 perspectively depicts a composite or laminate film or foil structure in accordance with the invention;

FIGURE 2 illustrates the laminate structure of FIGURE 1 in fragmentary cross-section;

FIGURE 3, in schematic and diagrammatic elevation, partly in cross-section, illustrates one means of preparing the laminated film products of the invention;

FIGURE 4 shows a means of pre-applying the intermediate polyalkylene imine adhesion promoting coating to the polyester substrate in order to provide pre-treated stock satisfactory for subsequent manufacture of the desired laminated, sheet-like products; and FIGURE 5, represented in a manner analogous to that of FIGURES 3 and 4, schematically more particularly demonstrates the application of the polyolefin layer to the treated substrate.

With initial reference to FIGURES 1 and 2, there are illustrated the laminated film or foil products of the present invention, generally designated by the reference numeral 10. The composite film 10 is comprised of a saran coated regenerated cellulose film or sheet layer 11 (with the regenerated cellulose portion designated in FIGURE 2 by the reference character "V" and the saran coating thereon by the reference character "S") over the saran coated surface of which there is deposited an intermediate adhesion-promoting coat or layer 13 of a small quantity of polyalkylene imine that is applied in a uniform or substantially uniform and relatively thin formation, to and with which there is effectively and efficiently laminated or bonded a coated layer 14 of the polyolefin polymer.

While the saran coated regenerated cellulose sheet layer 11 is herein generally referred to as the "substrate" or "base" and the polyolefin layer 14 as the applied layer or coating, it is readily apparent and will be understood by those who are skilled in the art that such terminology and description is merely for sake of convenience and identification. It is not to be construed or taken as being limiting or absolutely definitive of the presently obtained and provided structures. As is obvious, the polyolefin layer 14, which has been laminated with the saran coated regenerated cellulose film 11, is just as capable in most instances (and for many ultimate applications of the resulting laminated product) of being characterized as the "substrate" or "base" layer.

As mentioned, the composite, laminated film product 10 retains the essential and advantageous properties of both of the resin layers in the bonded integral structure. It is strong, tough and tear-resistant and has an attractive and highly decorative appearance. Its regenerated celluose surface (or, in the cases when a double saran coated substrate is employed, its exposed saran surface) tends to be more scuff-resistant and harder-to-mar than plain polyethylene and the like non-aromatic hydrocarbon polymers. In addition and of great significance, the laminated film product is generally extremely impermeable to most gases and vapors, being particularly effective moisture barriers.

Of paramount importance, as has been mentioned, the composite film product is capable of being strongly and efficiently heat sealed by joinder of the laminated polyolefin surfaces under the usual conditions in conventional thermal welding operations for plastic film.

The composite film or sheet-like products of the present invention are possessed of a strong and effective bond between the laminated saran coated regenerated cellulose and polyolefin layers 11 and 14, respectively. In most instances, the joined layers are extremely difficult, if not impossible, to strip apart or delaminate by ordinary physical methods.

The composite film and analogous sheet-like structures of the present invention have particular utility as wrapping and packaging materials for foodstuffs (as in the preparation of gas flush packages for cheeses and so forth) and for other articles such as pharmaceuticals, medicinal products, hardware, etc., especially in instances when it is desired to protect the packaged article from unwanted change in moisture content. The film products are also advantageous for wrapping and packaging foodstuffs and other materials which are intended to be handled or maintained and stored at relatively low temperatures in a refrigerated, or even in a frozen condition. Besides providing protection as a strong and tough flexible covering, they also more effectively prevent dehydration of the packaged articles and, where required, tend to avoid development of the condition known as "freezer burn" which frequently occurs in inadequately protected frozen foods.

Although the advantageous composite articles resulting from practice of the present invention are herein predominantly illustrated and described as film, foil and similar sheet-like products that are particularly useful for bags and the like heat-sealable packages, it is readily apparent that in many instances other composite structures and articles may also be prepared and provided such as and including tubes, cartons, boxes and other containers, liners therefor, and so forth.

Advantageously, the saran coated regenerated cellulose substrate film 11 which is laminated with the applied polyolefin layer is a relatively thin film or sheet-like structure. Likewise, the laminated layer 14 of the polyolefin resin that is bonded to the saran coated regenerated cellulose substrate by the intermediate polyalkylene imine adhesion-promoting coating 13 on the saran surface of the substrate is a relatively thin deposit. In this way, there is provided an ultimate laminated film product 10 of corresponding relatively little thickness.

Beneficial results, for example, are readily obtainable when the substrate film 11 (including the generally very thin saran coating thereon) has a thickness of at least about ¼ mil and not greatly in excess of about 10 mils. It is frequently desirable for the substrate saran coated regenerated cellulose film structure to have a thickness between about ½ mil and 2 mils.

Likewise, it is generally advantageous for the laminated polyolefin layer to have a thickness between about ¼ mil and about 10 mils and may frequently be more advantageous for the thickness of the applied polyolefin layer to be between about 1 and 2 mils.

Thus, the total thickness of the composite film product may advantageously be between about ½ mil and about 20 mils and, frequently more advantageously, between about 1½ and 4 mils.

The saran-coated regenerated cellulose substrates that are contemplated as being adapted for employment in the practice of the present invention include any of the regenerated cellulose materials of the type that are well-known in the art which are capable of being fabricated into useful film and related structures and coated on one or both surfaces with a layer of a saran polymer resin.

The regenerated cellulose film or foil of greatest interest is that which, as indicated, is frequently characterized as being cellophane and which is obtained from viscose by the well-known viscose process. This involves regeneration or coagulation of viscose in a suitable acid or other coagulating bath; followed by one or more of such operations on the thereby obtained article as washing, desulfurizing, bleaching, washing, drying, etc. If desired, however, the regenerated cellulose film or foil that is saran coated and utilized for the present invention may be obtained by practice of the well-known cuprammonium process.

The saran coating on the surface of the coated regenerated cellulose film may advantageously be such a saran copolymer as a copolymer of vinylidene chloride and vinyl chloride; or a copolymer of vinylidene chloride and acrylonitrile; or a copolymer of vinylidene and acrylic acid or its ester derivatives. It is particularly advantageous for the saran coating on the regenerated cellulose film to consist of a crystalline saran copolymer and even more advantageous for such coatings to consist of copolymer of vinyl chloride and vinylidene chloride that contain at least about 80 weight percent of polymerized vinylidene chloride in the copolymer molecule or, if desired, such copolymers of vinylidene chloride and acrylonitrile that contain at least about 60 and, preferably, from 85 to 95 weight percent of vinylidene chloride in the copolymer molecule. Of course, other saran copolymers of vinylidene chloride may also be employed, particularly those comprised of at least about 25 weight percent of polymerized vinylidene chloride in the copolymer molecule with any balance being one or more other monoethylenically unsaturated monomers that are copolymerizable with vinylidene chloride.

The polyethylene or other non-aromatic hydrocarbon polyolefin which is employed in the practice of the present invention may be polymers of any normally solid and film-forming nature. For example, the polymers of ethylene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, the ethylene and other non-aromatic hydrocarbon olefin polymers may be essentially linear and unbranched polymers, or polyolefin products similar to these materials. The essentially linear and unbranched, macromolecular, high density polyethylenes have been referred to as "ultrathenes." They ordinarily have greater apparent molecular weights (as may be determined from such characteristics as their melt viscosities and the like) than the "polythene" type polyethylenes and which are usually in excess of at least about 20,000 and generally in excess of about 40,000; densities of about 0.94–0.96 gram per cubic centimeter; and melting points in the neighborhood of 125–135° C. They are also ordinarily found to have a more crystalline nature than conventional polyethylenes and may contain less than 3.0 and even less than 0.3 methyl radicals per 100 methylene groups in the polymer molecule. The essentially linear and unbranched polymers of ethylene and other non-aromatic hydrocarbon olefins may be obtained under relatively low pressures of 1 to 100 atmospheres using such catalysts for polymerizing the ethylene or other olefin as mixtures of strong reducing agents and compounds of group IV–B, V–B, and VI–B metals of the periodic system; chromium oxide on silicated alumina; hexavalent molybdenum compounds; and charcoal supported nickel-cobalt.

As is apparent, the polyolefin polymers utilized in the practice of the present invention are generally prepared by polymerization of monoolefinic aliphatic olefin monomers, such as ethylene, propylene, butylene and so forth (including polymerizable mixtures thereof) that contain from 2 to about 8 carbon atoms, which monomeric olefins are frequently known as being 1-olefins due to their characteristic terminally unsaturated structures.

The polyalkylene imines which are utilized for providing the intermediate adhesion-promoting coating deposit 13 on the saran surface of the saran coated regenerated cellulose substrate in the composite film structures of the invention to secure the desired effective lamination between the saran coated regenerated cellulose and polyolefin layers 11 and 14 are advantageously one of the polyethylene imines which are of the general structure:

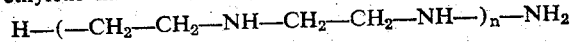

in which n has a numerical value of at least 1 and may be a larger, plural integer having a value as great as 1,000–2,000 and more. Thus, when a polyethylene imine is utilized for treating the surface of the substrate, it may be of any desired molecular weight in which the material can be obtained. It is generally most advantageous, however, to avoid use of very low molecular weight materials having excessive volatilities.

As is apparent, other polyalkylene imines equivalent to polyethylene imines (obtained by polymerization, in the known way, of the corresponding alkylene imines) may also be utilized as an intermediate adhesion-promoting coating to treat the surface of the substrate layer in place of, or in combination with, the polyethylene imine. Ordinarily it is of greatest practical significance for these to include any of the homologous polyalkylene imines which are comprised of alkylene units of less than about 4 carbon atoms. In most cases, although no limiting implications are intended, the polyalkylene imines of greatest interest to employ are the relatively low polymer, water-soluble materials whose viscosity in 20 percent aqueous solution at 20° C. are on the order of 100 poises.

Only a very small quantity of the polyalkylene imine need be deposited as an intermediate adhesive promoting coating on the surface of the saran coated regenerated cellulose substrate film to which the polyethylene or other non-aromatic hydrocarbon polymer layer is laminated. In general, an amount between about 5 grams and 100 grams per thousand square feet of substrate surface are suitable to facilitate and promote the adhesion of the polyolefin polymer layer on the substrate surface being laminated. Frequently, between about 20 and 50 grams per thousand square feet provides an entirely satisfactory result.

Although it can be directly applied if desired, the deposition of the polyalkylene imine is generally better and more conventionally and easily accomplished from a solution or dispersion of the adhesion-promoting agent in a suitable solvent, such as acetone, methyl ethyl ketone, methyl isopropyl ketone, lower alkyl alcohols (particularly those of less than 4 carbon atoms) etc. Methanol, ethanol and isopropanol are oftentimes found to provide optimum solvent behavior for the polyalkylene imine. Advantageously, a relatively dilute solution of the polyalkylene imine treating agent in the solvent is employed, such as one having a concentration of the polyalkylene imine between about 0.01 and 2 percent. Frequently, it is even more beneficial for the applicating solution of the polyalkylene imine to contain between about ⅛ and ½ percent by weight of the dissolved adhesion-promoting agent. This facilitates the uniform and general deposition over the surface of the substrate of the relatively minute quantities of polyalkylene imine needed for the intermediate adhesion promoting coating on the saran coated regenerated cellulose substrate prior to deposit or placement of the polyolefin polymer layer being laminated.

When the polyalkylene imines (such as polyethylene imine) are employed in too great a concentration on the substrate surface, they tend to result in undesirably weak and unsatisfactory laminated structures.

The coating application of the polyalkylene imine anchor layer may be made by spraying or spread coating the solution thereof on the surface of the polyester substrate being laminated to the polyolefin layer. Necessarily, the coating of the strongly cationic polyalkylene imine agent is dried by air or by means of heat at an elevated temperature on the surface of the polyester substrate prior to actual application thereover of the polyolefin layer being laminated therein.

In this connection, it is generally desirable to employ a relatively fugacious solvent in order to allow rapid and ready drying (with minimized or no external application of heat) of the applied polyalkylene imine solution. Thus, isopropanol, ethanol, or methanol are, as has been indicated, most beneficial to employ as solvents for the applicating solution of the polyalkylene imine. Such solvents can be easily dried in cool air (such as air at room temperature or with minimum requirements for heat) to deposit the adhesion-promoting intermediate layer of the polyalkylene imine on the surface of the substrate. Frequently, however, the use of warm air is found to be more practical for drying, especially when conditions of relatively high humidity in the atmosphere are encountered.

With reference to FIGURE 3 of the drawing, there is illustrated one means of manufacturing the composite film products of the present invention. As shown, the substrate 11 is passed from any suitable source of supply (not shown) with its saran coated surface uppermost under a point at which the polyalkylene imine is applied to the saran coated surface. This may be accomplished, as illustrated, by a spray 19 of a suitable applicating solution or other composition of the polyalkylene imine which is directed onto the saran coated surface of the substrate from a nozzle 18 controlled by a valve 17 to handle the polyalkylene imine solution in the conduit 16 from any suitable source of supply (not shown).

After application on the saran coated surface of the substrate 11, the polyalkylene imine-treated material is passed through a drying oven, illustrated schematically by the reference numeral 22, which heats the applied material sufficiently to remove all solvent vehicle therefrom prior to lamination of the polyolefin layer to the polyalkylene imine-treated substrate surface. While the drying oven 22 may generate any suitable temperature adequate to vaporize the solvent vehicle from the polyalkylene imine (but lower than that which might degrade the applied material or the substrate), it is generally advantageous to operate the oven in the neighborhood of 150° F. when the solvent vehicles of usual interest are employed in the polyalkylene imine solution. In this connection, as has been indicated, it is necessary to dry the polyalkylene imine adhesion-promoting layer completely from any associated solvent vehicle before passing the pre-treated substrate, indicated generally by reference numeral 12, to the subsequent polyolefin laminating operation.

After being dried on the saran coated surface of the substrate, the polyalkylene imine-treated material 12 is laminated with the desired polyolefin layer 14. This may be accomplished by passing the pre-treated substrate 12 between the nip of a pair of cooperating rolls consisting of a back-up roll 24 and a chill roll 25, driven by any suitable means and operating in the directions indicated by the arrows, wherein the molten polyolefin layer is applied to the pre-treated substrate 12 and chilled and efficiently laminated to form the composite film.

Thus, the polyolefin may be contained in an extruder 27, of any conventional or desired construction, adapted to expel a falling sheet-like layer or curtain 30 of molten polyolefin through a suitable die orifice 28 onto the polyalkylene imine-containing surface of the pre-treated substrate 12 in the nip of the rolls 24, 25. It is generally advantageous to maintain the polyolefin in the extruder, particularly when it is polyethylene, at a temperature sufficiently high to ensure its remaining in a fused and molten condition after being passed from the die to fall through the air as a layer on the surface of the pre-treated film. Thus, it is generally desirable for the extruded polymer to make contact with the pre-treated substrate while it is at a temperature of at least about 350–375° F. (at actual contact or juncture with the pre-treated substrate), particularly in the instances when polyethylene is being laminated. This generally requires the molten polymer in the extruder barrel, as it leaves the die lips, to be at a temperature between about 550 and 600° F.

In this connection, although the molten polyolefin may be passed any distance through the atmosphere from the outlet of the die 28 to the point of juncture with the pre-treated substrate, it is generally advantageous for a distance of not more than 12, advantageously about 6 to 10, inches to be utilized.

Immediately upon being applied, the polyolefin layer from the molten sheet 30 is chilled, solidified and laminated in place by the action of the chill roll 25 which is maintained at a temperature above the sticking temperature of the polyolefin but below its fusion point, which temperature, frequently, is most advantageously maintained in the range from about 80 to 100° F.

After being laminated in place, the polyolefin layer 14 on the treated substrate 12 provides the composite film product 10 of the present invention. The composite product may be taken up for subsequent use by any suitable means or in any desired manner, such as the into take-up roll 31 into which the composite film is shown being wound in FIGURE 3 of the drawing. Of course, if desired, it can be directly passed, without intermediate take-up, to any subsequent manufacturing operation in which it may be employed.

As a matter of actual practice, it is generally advantageous to form the pre-treated substrate in the manner illustrated in FIGURE 4 of the drawing. This provides for a supply of the intermediate treated substrate for subsequent lamination of such material. As shown in FIGURE 4, the adhesion-promoting polyalkylene imine coating 13 is provided and dried in place by spread coating the applicating solution thereof on the saran coated surface of the substrate 11 to form the intermediate, polyalkylene imine-treated substrate material 12. Thus, instead of spraying the applicating solution of the polyalkylene imine onto the surface of the substrate 11, it may advantageously be applied from a gravure coating roll and dried prior to take up as an intermediate product.

As is specifically illustrated in FIGURE 4, a supply of the substrate 11 in roll 32 is unwound and passed (with its saran coated surface lowermost) between a pair of cooperating rollers consisting of a gravure roll 36 (which advantageously may be knurled) and an upper impression roll 39 (which advantageously may have a rubber or the like surface). The gravure roll 36 is immersed in a suitable supply 34 of applicating solution of the polyalkylene imine contained in a gravure tank or the like container 33. The gravure roll 36, operating in the direction indicated by the arrow, picks up the applicating solution 34 of the polyalkylene imine and applies it to the saran coated surface of the substrate 11 being treated. Excess applicating solution may advantageously be wiped from the surface of the gravure roll 36 by a doctor knife 37 or the like scraper to ensure uniform application and avoid excesses of the solution. The treated substrate material is then passed around a roll 40 through a dryer 44 wherein the solvent vehicle is removed from the polyalkylene imine to provide the pre-treated substrate intermediate 12. The intermediate product 12, advantageously, may then be taken up into a supply roll 44 as stock material for subsequent use in the laminating operation.

Great care should be taken in applying the molten polyolefin to the surface of the pre-treated substrate. It is essential that the sheet of fused polymer to be laminated into the composite film product is not allowed to become solidified before contacting the treated substrate, as by first falling on the chill roll before entering the nip of the rolls wherein the lamination is effected. It is generally desirable, as illustrated in FIGURE 5 of the drawing, to feed the molten polyolefin polymer 30 on to the surface of the pre-treated substrate 12 just before the material to be laminated is passed through the nip of the cooperating rollers 24—25.

Actually, better results are generally obtained when the molten polyolefin 30 makes initial contact or juncture with the substrate prior to being chilled at just about the nip of the rolls, although suitable results are obtained if contact is made some distance back before the nip. Generally, however, the actual lateral distance at which contact is made before entering the nip of the rolls 24—25 (illustrated by the dimension "x" in FIGURE 5) should be within several inches and advantageously within about 1 inch from the nip of the roll.

In order to further illustrate the invention, a 300 gauge film of regenerated cellulose (from viscose) having a thickness of about 0.0011 inch and coated on one side with about a 0.1 mil deposit of a saran copolymer of about 85 weight percent of vinylidene chloride and 15 weight percent of vinyl chloride ("K-Film") was treated on its saran coated surface with polyethylene imine at the rate of about 1 gallon of applicating solution per 600 square yards of film using an applicating solution consisting of about 3/8 percent by weight, based on the weight of the applicating solution, of polyethylene imine in ethanol. This represented an actual application of about 30 grams of the polyethylene imine per thousand square feet of film surface. The polyethylene imine employed had an average molecular weight on the order of about 7,000. The applicating solution was prepared by mixing the alcohol with 3/4 percent by weight of a 50 percent aqueous solution of the polyethylene imine.

The application of the polyethylene imine solution was made in a manner similar to that illustrated in FIGURE 4 of the drawing, using gravure rolls having a diameter of about 6 inches and a width of about 40 inches for application of the solution to the saran coated surface of the film substrate. After application of the polyethylene imine, the adhesion-promoting coating thereof was dried on the surface of the substrate in an oven at a temperature of about 150° F. prior to being taken up as a stock or supply roll of the intermediate pre-treated substrate film.

The thereby-obtained pre-treated substrate was then laminated with polyethylene using a procedure as illustrated in FIGURE 5 of the drawing. The polyethylene imine coated substrate film was run at a linear rate of about 100 feet per minute under an extruder for the polyethylene discharging into the nip of a pair of rolls, consisting of an 18 inch diameter back-up roll and a 2 foot diameter chill roll (with the chill roll being maintained at about 80° F.), through which the substrate was being passed.

About a 2 mil layer of polyethylene was applied from the extruder to the pre-treated substrate by feeding the molten polymer layer in the form of a falling sheet or curtain (through about an 8 inch fall) from the die lips to the nip of the rolls. The temperature of the polyethylene in the barrel of the extruder at the die was about 600° F. Its temperature at contact with the substrate was about 375° F.

The polyethylene employed was the conventional, branch-structured variety of polyethylene (of the "polythene" type) having a melt index (according to ASTM D-1238-52T) of about 3.0. After being cooled and solidified and laminated in place, the resulting composite film structures were taken up into a supply roll.

The resulting composite film structures were tested to determine the cohesive properties of the laminated layers in the film and the heat sealability of the product by means of a heat seal peel test. This test consisted of measuring the force in pounds that was necessary to separate 1 inch wide strips of the applied polyethylene layers which had been heat sealed together at 300° F. and pulled in a Scott Tester in the machine direction. The composite film did not fail in any instance, either as regards the laminated layers or the heat sealed strips, when less than 3 pounds of pull were exerted on any of the sealed specimens tested.

About the same results are obtained when the foregoing procedure is repeated excepting to laminate essentially linear and unbranched polyethylene in the composite film structure being made; or to apply a layer of polyethylene or a layer of a copolymer of polypropylene and ethylene (such as one containing about equal weight percentages of each monomer in the polyolefin product) on the treated substrate; or when other saran coated regenerated cellulose substrates are utilized including those made from other varieties of regenerated cellulose and those having other specific types of saran coatings thereon; or when other polyalkylene imines within the scope indicated in the foregoing specification are employed to provide the adhesion-promoting coating on the surface of the substrate with which the polyolefin layer is laminated.

Certain changes and modifications in the practice of the present invention can be readily entered into without substantially departing from its intended spirit and scope. Therefore, it is to be fully understood that the invention is not to be limited or in any way restricted by the preferred embodiments thereof which are set forth in the foregoing description and specification. Rather, its purview is to be interpreted and construed in the light of what is set forth and delineated in the hereto appended claims.

What is claimed is:

1. Method for preparing a composite laminate film structure which comprises applying to the saran coated surface of a substrate of a saran coated regenerated cellulose film between about 5 grams and about 100 grams per thousand square feet of substrate surface of a polyalkylene imine comprised of alkylene units containing from 2 to about 4 carbon atoms as an adhesion-promoting preliminary and intermediate coating on the saran coated surface of said substrate, said saran coating being a copolymer containing between about 25 and about 95 weight percent polymerized vinylidene chloride; then depositing a molten layer of a normally solid, film-forming, non-aromatic hydrocarbon olefin polymer over said intermediate coating of said polyalkylene imine on said preliminarily treated substrate; then cooling said applied polyolefin layer to a normal temperature to solidify same on said substrate and form a tightly adhering and effectively laminated polyolefin layer on said substrate.

2. The method of claim 1, wherein said polyalkylene imine is polyethylene imine.

3. The method of claim 1 and including, in addition thereto and in combination therewith, the steps of applying said polyalkylene imine to the saran coated surface of said substrate from an applicating solution of said polyalkylene imine in a volatile solvent vehicle therefor and, after said application, drying said solvent vehicle from said applied polyalkylene imine.

4. The method of claim 3, wherein said solution contains between about 0.01 and 2 weight percent, based on the weight of said solution, of said polyalkylene imine dissolved therein.

5. The method of claim 3, wherein said solution contains between about 1/8 and 1/2 weight percent, based on the weight of said solution, of said polyalkylene imine dissolved therein.

6. The method of claim 3, wherein said solvent is a lower alkyl alcohol.

7. The method of claim 1, wherein said substrate is regenerated cellulose from viscose coated with a saran copolymer of vinylidene chloride and vinyl chloride.

8. The method of claim 1, wherein said substrate is a regenerated cellulose film having a thickness between about 1/4 mil and about 10 mils and having a saran coating thereon between about 0.02 and 0.5 mil.

9. The method of claim 1, wherein said laminated polyolefin layer has a thickness between about 1/4 mil and about 10 mils.

10. The method of claim 1, wherein said polyalkylene imine is applied on the saran coated surface of said substrate film in an amount between about 20 and about 50 grams per thousand square feet of substrate surface.

11. The method of claim 1, wherein said molten polyolefin layer is placed in contact with said polyalkylene imine-treated substrate at a temperature, at actual contact of said molten polyolefin with the surface of said treated substrate, of at least about 350–375° F. but beneath the decomposition temperature of said polyolefin.

12. Composite structure which comprises, in intimate joined lamination, (1) a substrate layer of saran coated regenerated cellulose having a thickness between about 1/4 and about 10 mils including said saran coating of between about 0.02 and 0.5 mil, said saran coating being a copolymer containing between about 25 and about 95 weight percent polymerized vinylidene chloride, said substrate layer being uniformly coated on its saran coated surface with (2) an intermediate adhesion-promoting layer of between about 5 and about 100 grams per thousand square feet of substrate surface of a polyalkylene imine comprised of alkylene units containing from 2 to about 4 carbon atoms; and (3) a tightly adhered superficial layer over said applied coating of polyalkylene imine of a film-forming non-aromatic hydrocarbon olefin polymer having a thickness between about ¼ mil and about 10 mils.

13. The composite structure of claim 12, wherein said substrate layer has a thickness between about ½ mil and about 2 mils.

14. The composite structure of claim 12, wherein said substrate layer consists of regenerated cellulose from viscose having a saran coating of a copolymer of vinylidene chloride and vinyl chloride.

15. The composite structure of claim 12, wherein said substrate layer consists of regenerated cellulose from viscose having a saran coating of a copolymer of vinylidene chloride and acrylonitrile.

16. The composite structure of claim 12, wherein the polyalkylene imine adhesion-promoting intermediate layer is polyethylene imine.

17. The composite structure of claim 12, wherein said substrate layer is coated with between about 20 and about 50 grams per thousand square feet of substrate surface of said polyalkylene imine.

18. The composite structure of claim 12, wherein said layer of non-aromatic hydrocarbon olefin polymer has a thickness of between about 1 and 2 mils.

19. The composite structure of claim 12, wherein said non-aromatic hydrocarbon olefin polymer is polyethylene.

20. The composite structure of claim 12, wherein said non-aromatic hydrocarbon olefin polymer is polypropylene.

References Cited in the file of this patent

UNITED STATES PATENTS 2,570,478    Pitzl   -------------------- Oct. 9, 1951

FOREIGN PATENTS 786,764    Great Britain ----------- Nov. 27, 1957